(12) United States Patent
Collins et al.

(10) Patent No.: US 7,577,905 B2
(45) Date of Patent: Aug. 18, 2009

(54) APPLYING A DESIGN TO A SLIDE USING EQUIVALENT LAYOUTS

(75) Inventors: Nathalie S. Collins, Sunnyvale, CA (US); Hoa N. Lu, Oakland, CA (US); Dennis Coh, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 695 days.

(21) Appl. No.: 11/152,755

(22) Filed: Jun. 13, 2005

(65) Prior Publication Data

US 2006/0282779 A1 Dec. 14, 2006

(51) Int. Cl.
*G06F 17/00* (2006.01)
(52) U.S. Cl. .................................. 715/243; 715/732
(58) Field of Classification Search ................ 715/200, 715/246, 243–244, 731–732
See application file for complete search history.

(56) References Cited

U.S. PATENT DOCUMENTS

| | | | | |
|---|---|---|---|---|
| 5,499,366 A | * | 3/1996 | Rosenberg et al. | 707/4 |
| 6,035,323 A | * | 3/2000 | Narayen et al. | 709/201 |
| 6,081,262 A | * | 6/2000 | Gill et al. | 715/202 |
| 7,386,791 B2 | * | 6/2008 | Jacobson | 715/274 |
| 7,500,194 B2 | * | 3/2009 | Collins et al. | 715/732 |
| 2002/0194227 A1 | * | 12/2002 | Day et al. | 707/523 |
| 2004/0034829 A1 | * | 2/2004 | Ohashi et al. | 715/500.1 |
| 2004/0243930 A1 | * | 12/2004 | Schowtka et al. | 715/513 |
| 2005/0108619 A1 | * | 5/2005 | Theall et al. | 715/500 |
| 2005/0171758 A1 | * | 8/2005 | Palmquist | 704/4 |
| 2006/0136827 A1 | * | 6/2006 | Villaron et al. | 715/730 |
| 2006/0156218 A1 | * | 7/2006 | Lee | 715/500.1 |
| 2006/0259858 A1 | * | 11/2006 | Collins et al. | 715/517 |
| 2006/0294046 A1 | * | 12/2006 | Sareen et al. | 707/1 |

OTHER PUBLICATIONS

Bebera et al., Combining Color and Layout Features for the Identification of Low-resolution Documents, Google Mar. 2005, pp. 1-8.*

* cited by examiner

*Primary Examiner*—Cong-Lac Huynh
(74) *Attorney, Agent, or Firm*—Merchant & Gould, P.C.

(57) ABSTRACT

A new design is applied to a slide. A search is made within layouts associated with the new design for an equivalent layout to the slide's layout. When an equivalent layout is found, the placeholders are mapped from the slide to a new slide base on the equivalent layout. An equivalent layout is determined based on a comparison between the slide's layout and the new design. The comparison is based on the name of the layouts, the number of placeholders, and whether the placeholders are of an equivalent type.

20 Claims, 7 Drawing Sheets

APPLYING A DESIGN TO A SLIDE USING EQUIVALENT LAYOUTS

BACKGROUND OF THE INVENTION

Many individuals and businesses prepare and deliver presentations using a computer presentation program. Typically, presentation programs allow the user to edit, create, and present slides using their computer. A user selects from predefined slide layouts and then configures the set of slides for their presentation based on the predefined layout that was selected. Conveying the look and feel the user desires, however, may be difficult to achieve. The user may additionally desire to use a slide within another presentation, other than the presentation the slide was originally designed for. Using the slide, in the new presentation, however, may not look as good within the new presentation as it did in the original presentation.

SUMMARY OF THE INVENTION

Embodiments of the present invention are related to applying a new design to a slide within a presentation.

According to one aspect of the invention, a new design is applied to a slide that was originally associated with another design. A search is made for a layout that is associated with the new design that is an equivalent layout to the slide's layout. An equivalent layout is determined based on a comparison between the slide's layout and a layout that is associated with the new design. Once an equivalent layout is found, the placeholders on the slide are mapped to the equivalent layout. Applying the equivalent layout to the slide helps to ensure that the position of placeholders on the new slide does not overlap the background content associated with the new design.

According to another aspect of the invention, exceptions are maintained that are associated with a placeholder on the slide. For example, the position and/or size of a placeholder on the slide could have been changed. An exception to one or more of the placeholders made on the slide may cause them to overlap a portion of the background content.

DETAILED DESCRIPTION OF THE PREFERRED EMBODIMENT

Generally, embodiments of the present invention are related to applying a new design to a slide. A search is made within layouts associated with the new design for an equivalent layout to the slide's layout. When an equivalent layout is found, the placeholders are mapped from the slide to a new slide based on the equivalent layout. An equivalent layout is determined based on a comparison between the slide's layout and a layout that is associated with the new design. The comparison is based on the name of the layout, the number of placeholders, and whether the placeholders are of an equivalent type. The layouts associated with a design may be predefined slide layouts that include a predetermined number of placeholders or customized layouts that include an arbitrary number of placeholders. When the slide is based on a predefined layout, it is more likely that an equivalent layout will be found since each design created will be likely to include the same set of predefined layouts.

Illustrative Inheritance Model for Presentation System

Figure 2:
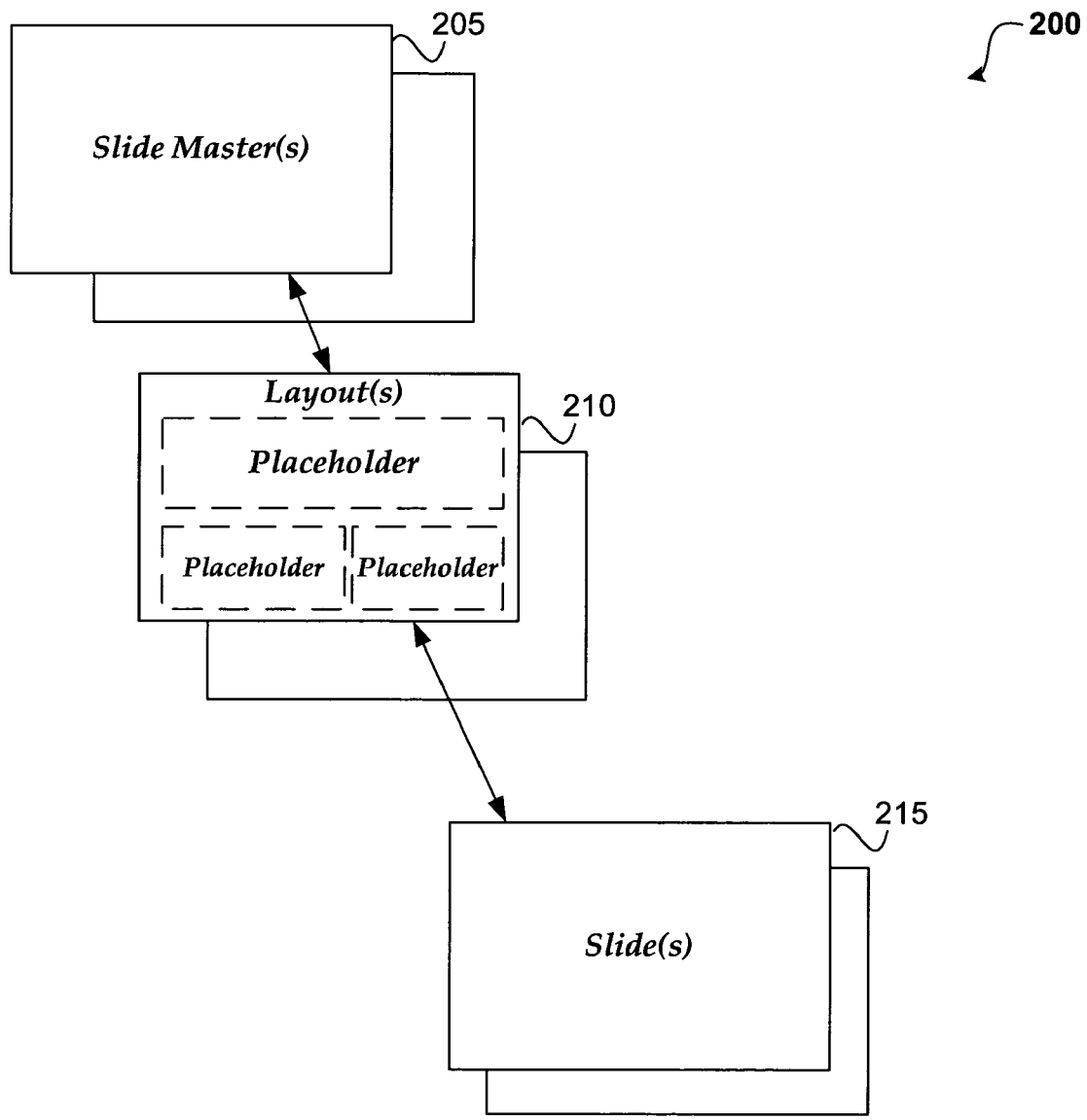
FIG. 2 shows a general overview of an inheritance model between slides within a presentation.

FIG. 2 shows a general overview of an inheritance model between slides within a presentation, in accordance with aspects of the present invention. Referring to FIG. 2, three hierarchical layers are illustrated within the system including slide master 205, original layout 210, new layout 212 and slide(s) 215.

According to one embodiment of the invention, each presentation includes at least one slide master (205) and each slide master may include zero or more layouts that may be associated with zero or more slides (215). Slide master 205 is at the highest level within the hierarchy. Original layout 210 and new layout 212 are located at the second level within the hierarchy and the slides (215) are at the third level within the hierarchy. Slides 215, therefore, inherit their corresponding properties from associated layouts and the layouts inherit properties from an associated slide master. Changes made to the slide master propagate to the layout level and then propagate to the slide level. Changes made to the layout propagate down to the associated slides. Therefore, when a new layout is applied, the changes are propagated down to the slides (215). When an exception can be made to a property at one or more of the hierarchical levels, that overrides the inheritance of that property from parent layers.

Slide master 205 helps to enable presentation authors to create an overall look and feel for a presentation. Each slide master may be considered a "design" that is associated with the presentation. The slide master determines the styles and background for the presentation. The slide master(s) define characteristics including the background, color scheme and text styles associated with the presentation. Slide masters also store the global placeholder and text style definition that is the default for a layouts' position and size of: title placeholders; header, footer and slide placeholders.

One or more layouts are used to define properties, such as the geometries, associated with slides 215. According to one embodiment, a default list of predefined layouts are provided with each master. These predefined layouts include a predefined number of placeholders and may represent many different layouts. Presentation authors can also add additional custom layouts having an arbitrary number of placeholders that can be used and that are based on their own design criteria. Presentation authors may also apply a new design to an existing slide(s) to create a new look and feel for a slide or slides used within a presentation.

Slides point to layouts for their placeholder and slide-level properties. Generally, layouts (both predefined and custom) derive the default position of their title, date/time, footer, and slide number placeholders from their counterparts on the master. For each of these placeholders, if no size or position changes have been made on the layout, then their position/size is inherited from the master. Each layout, such as layout 210, may include its own number and arrangement of body placeholders that share the global style definition from the slide master by default, but may also store unique size and position information for each layout.

Slides 215 inherit properties from layout 210. If another layout is applied to one or more of the slides, the slides pointing to the newly applied layout reflect the shape and text properties of the newly applied layout.

When new design is applied to one or more of the slides, an attempt is made to locate an equivalent layout within the new design that corresponds to the slide's layout. If an equivalent layout is found then the placeholders within the slide are matched with the placeholders in the equivalent layout within the newly applied design. Typically this results in the placeholders not obscuring the background elements. Applying a new design to a slide allows the presentation author to change the look and feel of a slide (background formatting, placeholder properties, etc.). This helps to enable template designers to be able to reuse slides.

Applying New Design to Slide

Figure 3:
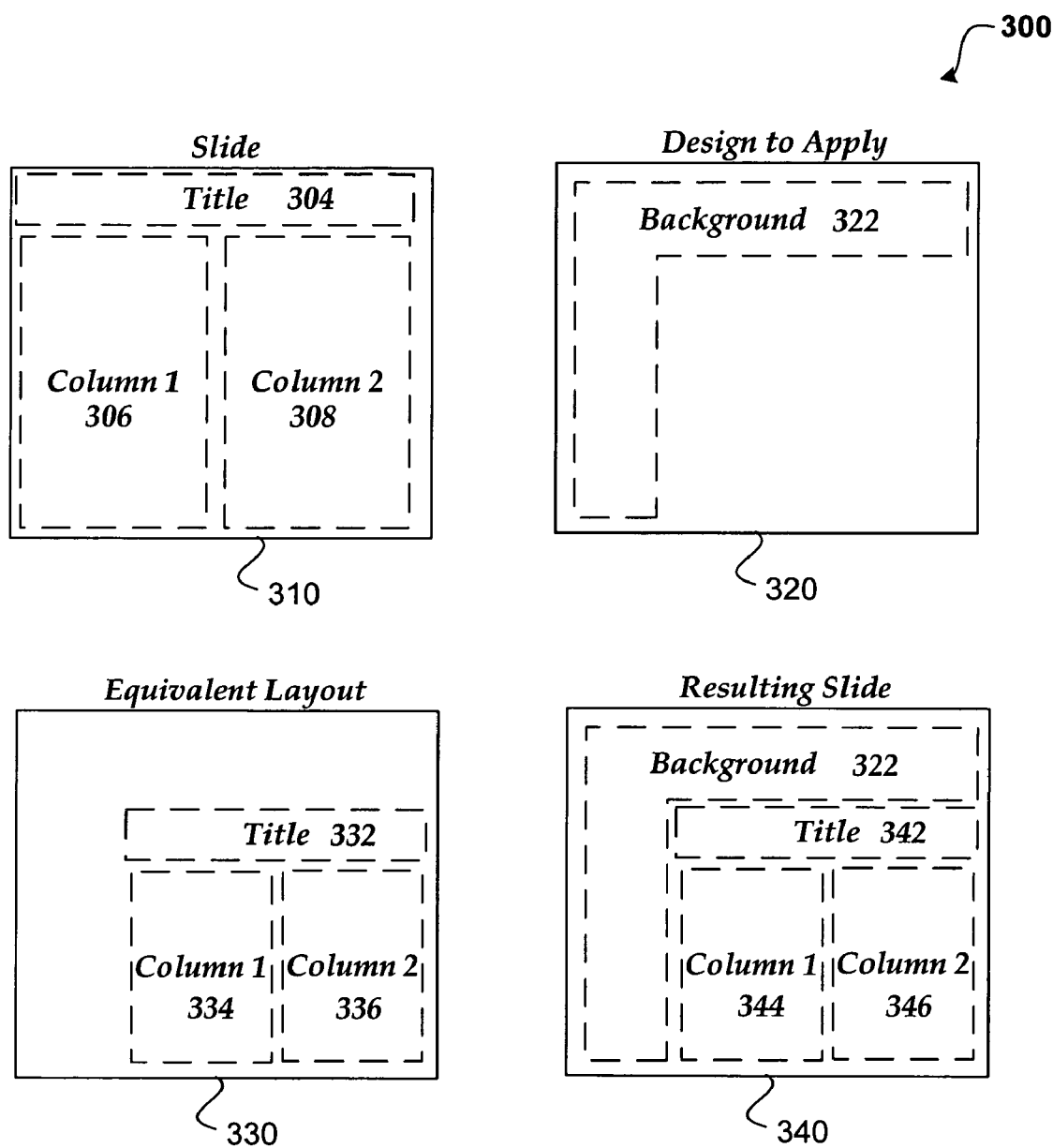
FIG. 3 illustrates applying a new design to a slide.

FIG. 3 illustrates applying a new design to a slide (300), in accordance with aspects of the invention. For purposes of this example, a presentation author desires to change the appearance of a slide (310) by applying a new design (320).

As can be seen, slide 310 includes three placeholders: a title placeholder (304) and two column placeholders (306 and 308). Title placeholder 304 is located at the top of slide 310 and extends across the majority of the top of the slide. The column placeholders (306 and 308) are located beneath the title placeholder (304) and each of the columns occupy approximately half of the space in the slide below the title placeholder.

The design to apply (320) includes a background (322) that occupies part of the top and left hand sides of a slide. If the design were applied to slide 310 with no modifications to the placeholders on slide 310, the resulting slide would not look correct since the title would be placed over the top of the background and part of column 1 would cover a portion of the background. Instead, the placeholders associated with slide 310 are attempted to be positioned such that the background is not obscured. In other words, the look and feel of the new design is attempted to be maintained even though the slide initially had a different look and feel.

When a user desires to apply a new design to a slide, an equivalent layout is searched for that is associated with the new design. Each of the layouts within the new design are compared to the slide's layout to locate an equivalent layout that matches the layout of the slide. Generally, an equivalent layout is a layout that includes the same number of placeholders, the layouts share the same name and are of an equivalent type to the placeholders in the slide (See FIG. 4 and related discussion). In this particular example, an equivalent layout would include a title placeholder, a column 1 placeholder and a column 2 placeholder.

Layout 330 illustrates an equivalent layout to the slide's layout. Layout 330 includes a title placeholder (332) and two column placeholders (334 and 336) positioned such that they do not obscure background 322. Once an equivalent layout is found, the placeholders within the slide are matched to the placeholders within the equivalent layout. Applying the new design (320) using the equivalent layout (330) results in resulting slide 340. As can be seen, the position of the placeholders (342, 344, and 346) on the resulting slide do not overlap the background content (322) and therefore the slide with the newly applied design continues to look good with the newly applied design.

Figure 4:
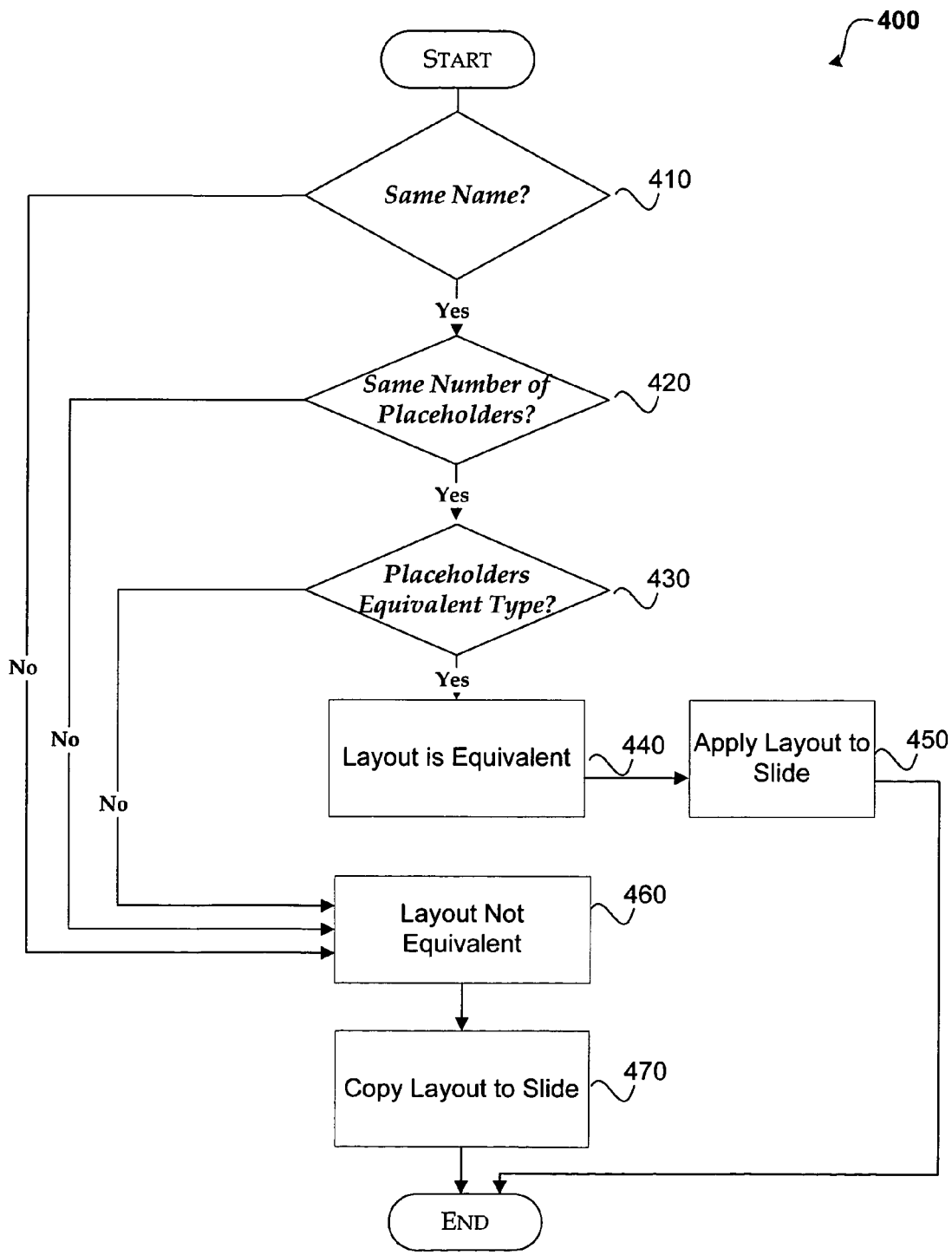
FIG. 4 shows a process for determining an equivalent layout.

FIG. 4 shows a process for determining an equivalent layout, in accordance with aspects of the invention. Generally, an attempt is made to find a corresponding layout in the new design that matches the slide's layout. If a match is found, the equivalent layout is applied to the slide maintaining the property exceptions on the slide as well as any user-drawn objects in some circumstances. According to one embodiment, when a match is not found, the slide's current layout is copied into the new design as a child of the new master. The following process examines each of the layouts within the newly applied design until an equivalent layout is found or there are no more layouts in the new design.

After a start block, the process moves to decision block 410 where a determination is made as to whether each of the placeholder names within the slide share the same placeholder names within the layout being compared in the new design. The names being compared may be any names associated with the layout itself, such as an internal name or a display name. An internal name is a name that is maintained by the presentation program for the layout and could be represented many different ways. For example, the internal name could be a unique identifier, a number, a character, a string of characters and the like. A display name is typically a user friendly name that is displayed with the layout. For example, a display name may be "Title Slide," "Blank," "Title and 2-Column" and the like. According to one embodiment, the layouts share the same name if both of the layouts have the same display name. According to another embodiment, the layouts share the same name if both of the layouts have the same internal name. According to yet another embodiment, a combination of the internal names and display names may be used to determine whether the layouts share the same name.

According to yet another embodiment, when the internal name is set by a user, the internal name takes precedence over the display name when determining whether the layouts share the same name. Under this scenario, if the internal name is set, then the comparison is based on the internal names, otherwise the match is based on the display name. According to still yet another embodiment, a mapping table may be employed that handles localized names by mapping a standard layout name from one language into another language.

When the same names are not shared, the process moves to block 460 where it is determined that the layouts are not equivalent. If there are more layouts to be compared the process returns to block 410.

When the same names are shared, the process moves to decision block 420 where a determination is made as to whether the slide has the same number of placeholders as compared to the number of placeholders in the new layout being compared. For example, the slide shown in FIG. 3 has three placeholders. When the layouts do not have the same number of placeholders, the process moves to block 460 where it is determined that the layout is not an equivalent. According to one embodiment, when the layouts are not determined to be equivalent, the process moves to block 470 where the slide's current layout is copied into the new design as a child of the new master.

When the layout does have the same number of placeholders as the slide, the process moves to decision block 430 where a determination is made as to whether the placeholders are equivalent between the slide and the layout. In order to be considered equivalent, the placeholders may be of an equal type or of an equivalent type. Generally, an equivalent placeholder is a placeholder that is used to store the same or similar content. An equal type placeholder is a placeholder of the same type. According to one embodiment, the following table illustrates equivalent placeholders. Other equivalents may be used and may vary based on the slide layout program being used.

| Type | Title | Vertical Title | Center Title | Subtitle | Body | Vertical Body | Object (Generic) | Chart | Bitmap | Media | OrgChart | Table | Slide# | Header | Footer | Date |
|---|---|---|---|---|---|---|---|---|---|---|---|---|---|---|---|---|
| Title | X | X | X | | | | | | | | | | | | | |
| Vertical Title | X | X | X | | | | | | | | | | | | | |
| Center Title | X | X | X | | | | | | | | | | | | | |
| Subtitle | | | | X | X | X | X | | | | | | | | | |
| Body | | | | X | X | X | X | | | | | | | | | |
| Vertical Body | | | | X | X | X | X | | | | | | | | | |
| Object (Generic) | | | | T | T | T | X | O | O | O | O | O | | | | |
| Chart | | | | | | | X | X | X | X | X | X | | | | |
| Bitmap | | | | | | | X | X | X | X | X | X | | | | |
| Media | | | | | | | X | X | X | X | X | X | | | | |
| OrgChart | | | | | | | X | X | X | X | X | X | | | | |
| Table | | | | | | | X | X | X | X | X | X | | | | |
| Slide# | | | | | | | | | | | | | X | | | |
| Header | | | | | | | | | | | | | | X | | |
| Footer | | | | | | | | | | | | | | | X | |
| Date | | | | | | | | | | | | | | | | X |

X = any content type;
T = text only;
O = object only

When each placeholder within the new layout is not of the equivalent type or equal type as compared to the placeholders on the slide, the process moves to block 460 where it is determined that the layout is not an equivalent.

When each of the placeholders are equivalent, the process moves to block 440 where the layout is determined to be an equivalent to the slide's layout. The process then moves to block 450, where the placeholders associated with the slide are matched to the equivalent layout. Generally, the content within each placeholder on the slide is mapped to the equivalent placeholders within a new slide.

The process then moves to and end block, where the process returns to processing other actions.

Figure 5:
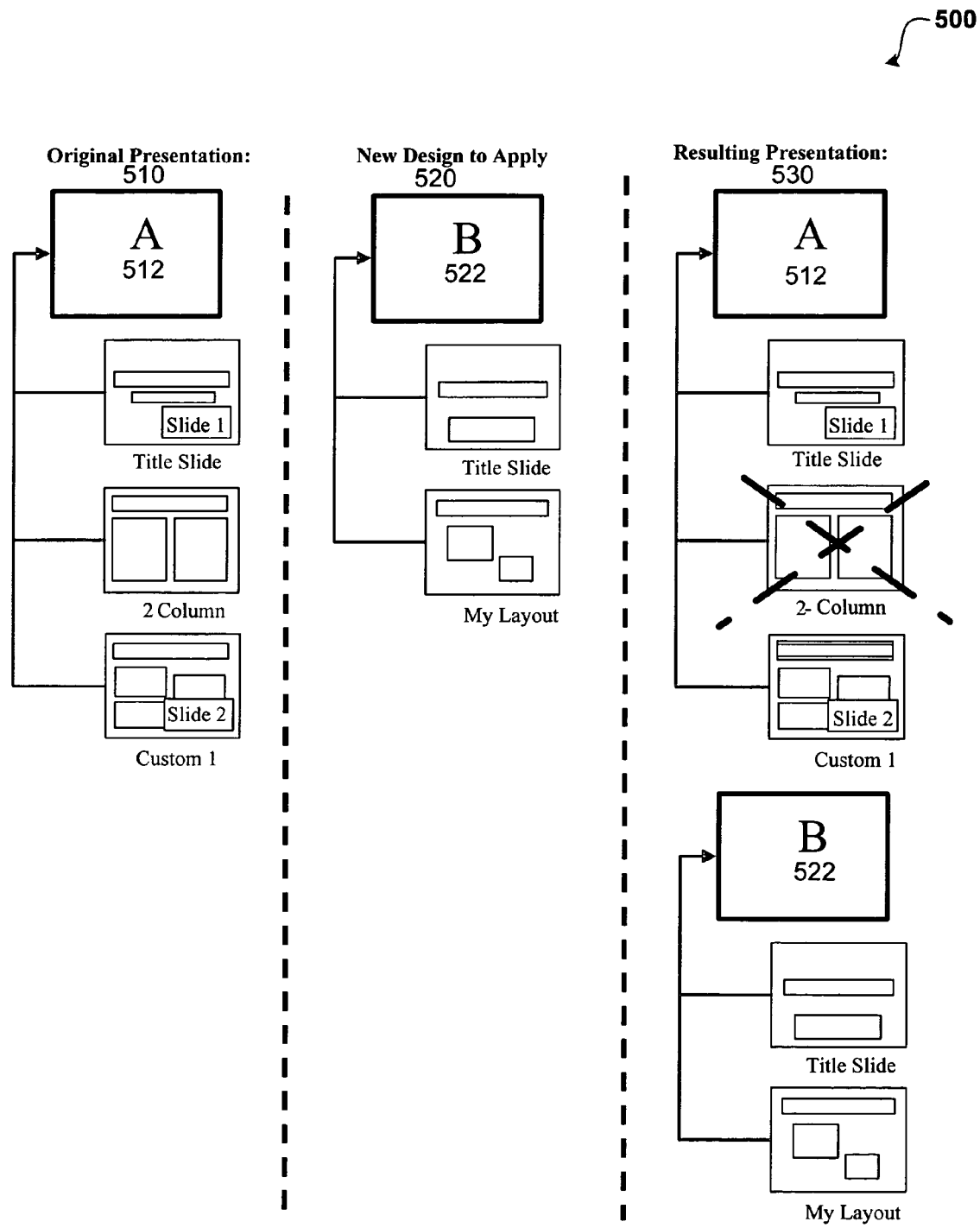
FIG. 5 illustrates joining a new design within an original design.

FIG. 5 illustrates joining a new design within an original design, in accordance with aspects of the invention. Initially, an original presentation is created (510) by a presentation author. As illustrated, the original presentation (510) includes slide master A (512) and three associated layouts: a title slide layout, a 2 column layout, and a custom layout. Two slides are illustrated within original presentation 510: slide 1 and slide 2. Slide 1 is based on the title slide layout and Slide 2 is based on the Custom 1 layout.

New design to apply 520 includes slide master 522 and two associated layouts: a title slide layout and a custom layout entitled "My Layout." Suppose that a user now desires to apply the new design (520) to slides 1 and 2 contained within the original presentation (510).

Initially, a copy of the applied design (520) is copied into the original presentation resulting in a resulting presentation (530). According to one embodiment, this involves copying all of the masters and layouts associated with the new design to apply into the original presentation. As can be seen, copying new design to apply 520 results in resulting presentation 530 that includes the content of the original presentation as well as the content of the new design to apply. According to one embodiment, layouts that are not being used by a slide are not copied into the resulting presentation. For example, assume that the two column layout illustrated in the original presentation is not a slide, then it would not be copied over to the resulting presentation.

Figure 6:
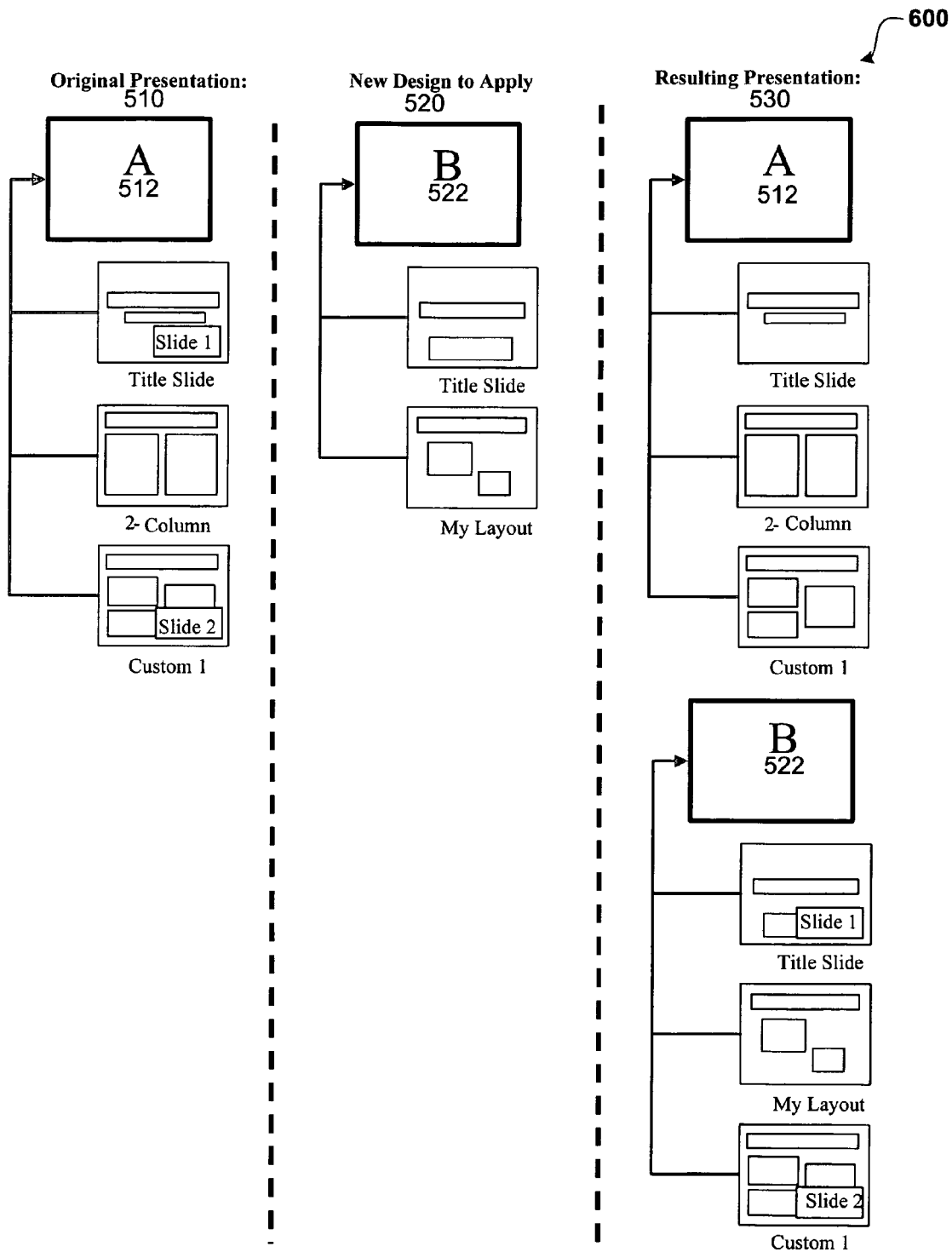
FIG. 6 shows applying the new design to apply to the slides.

FIG. 6 shows applying the new design to the slides, in accordance with aspects of the present invention. FIG. 6 is similar to FIG. 5 but Master B includes an additional layout (Custom 1) and the slides (Slide 1 and Slide 2) that where based on the layouts underneath slide master A (512) shown under slide master A in the resulting presentation (530) are now based on layouts underneath slide master B which is the new design. FIG. 5 is an intermediate step on the way to FIG. 6.

Once the masters and layouts are combined within the resulting presentation, an equivalent layout is searched for under the newly added master(s). In this example, the layouts shown underneath slide master B are compared to the slide's layout.

If an equivalent layout is found, an apply layout operation is performed whereby the layout in the new design is applied to the slide(s) matching the equivalent layout that desires to have the new layout applied. According to one embodiment, slide-level exceptions are preserved (See FIG. 7 and related discussion).

In the present example, the equivalent layout for slide 1 is the title slide layout under master B. No equivalent layout was found for Slide 2. Slide 2 is based on the Custom 1 layout which does not have an equivalent under slide master B.

If an equivalent layout is not found (as in this example), then the slide's layout within the original presentation is copied into the new design. According to one embodiment, the layout is added to the end of the new master's layout collection. The slide continues to point to its same layout although it now exists in another main master's collection. Any exceptions made to a layout with respect to its main master are kept when that layout is copied (whether explicitly or implicitly) to another main master's collection. So if the background of the layout was set to green, it remains green (or the equivalent color scheme color) when moved to the other master's collection.

According to one embodiment, if a master no longer has any slides that depend on it after a new design has been applied, it is deleted along with any layouts that depend from the master.

When an object is drawn or inserted on a standard or custom layout they are marked as "user drawn." This includes objects that are inserted via drag/drop, insert object, copy-and-paste, drawing tools, or object model calls. As shown in FIG. 8, user-drawn objects are copied from the original design to its equivalent layout in the newly applied design. According to one embodiment, user-drawn objects are carried over into the new slide only in a limited number of cases. According to this embodiment, user drawn objects are copied from the original design when copying them does not modify other existing slides in the presentation.

Figure 7:
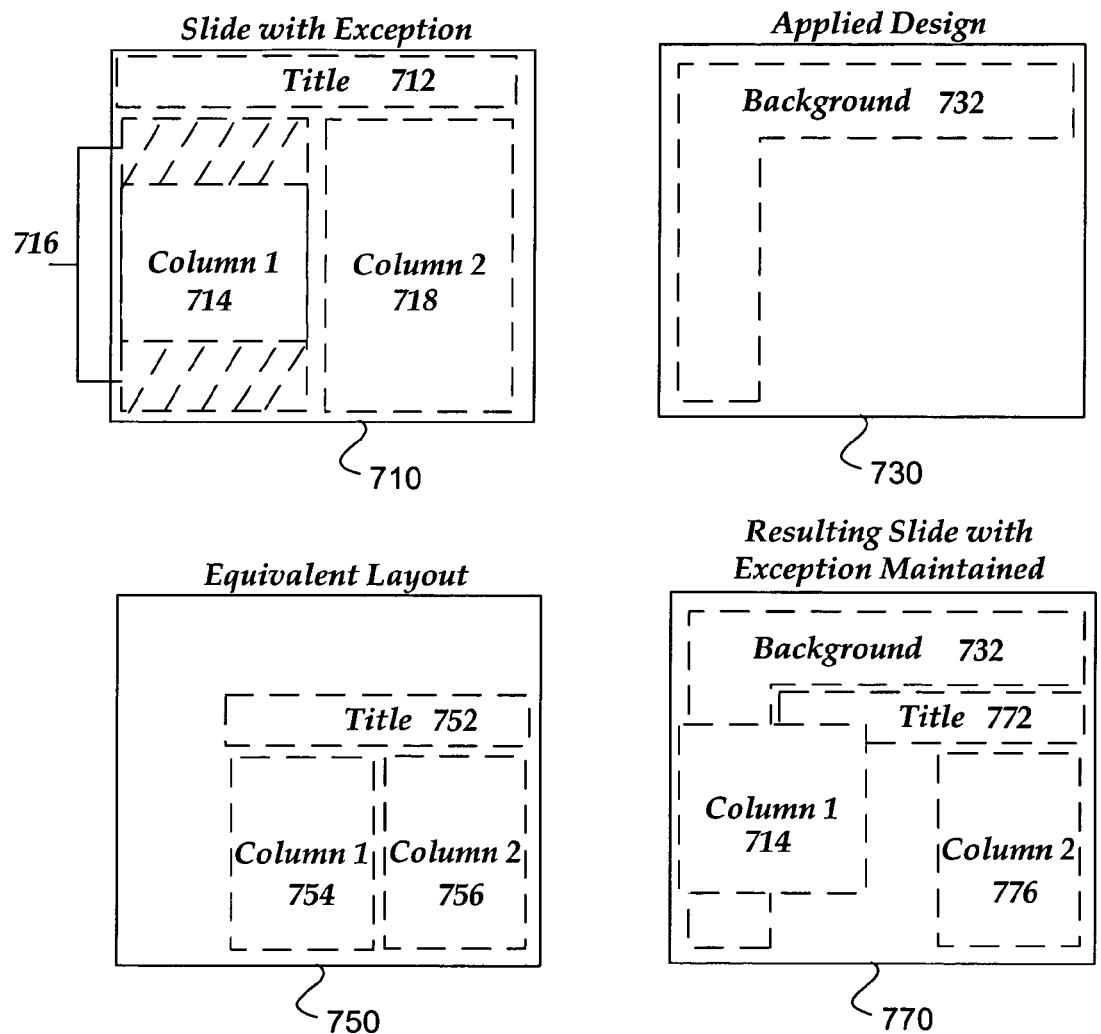
FIG. 7 shows maintaining a slide level exception when a design is applied to a slide, in accordance with aspects of the invention.

FIG. 7 shows maintaining a slide level exception when a design is applied to a slide, in accordance with aspects of the present invention. According to one embodiment, slide level exceptions are preserved when a new design is applied to a slide. For example, if a placeholder is resized on the slide then the placeholder maintains its original position on the resulting slide after the design is applied.

Referring to FIG. 7, placeholder 714 has been resized such that it is smaller in size as compared to the original layout. Hashing 716 illustrates the resizing of placeholder 714. Although not shown, many other exceptions could have been made on the slide. For example, one or more of the placeholders could have been moved or any of their shape or text properties (color, font, etc.) changed. In the present example design 730 is to be applied to slide 710 using equivalent layout 750. After the equivalent layout (750) is applied, the placeholders are positioned as shown in resulting layout 770. As can be seen, the Column 1 (714) placeholder maintains the same position and size as illustrated within slide 710 since an exception was made. The other placeholders on the slide are mapped into their corresponding equivalent placeholder based on the size and position of the placeholders in the equivalent layout. Title 712 is mapped to title 772 and Column 2 (718) is mapped to Column 2 (776).

Illustrative Operating Environment

Figure 1:
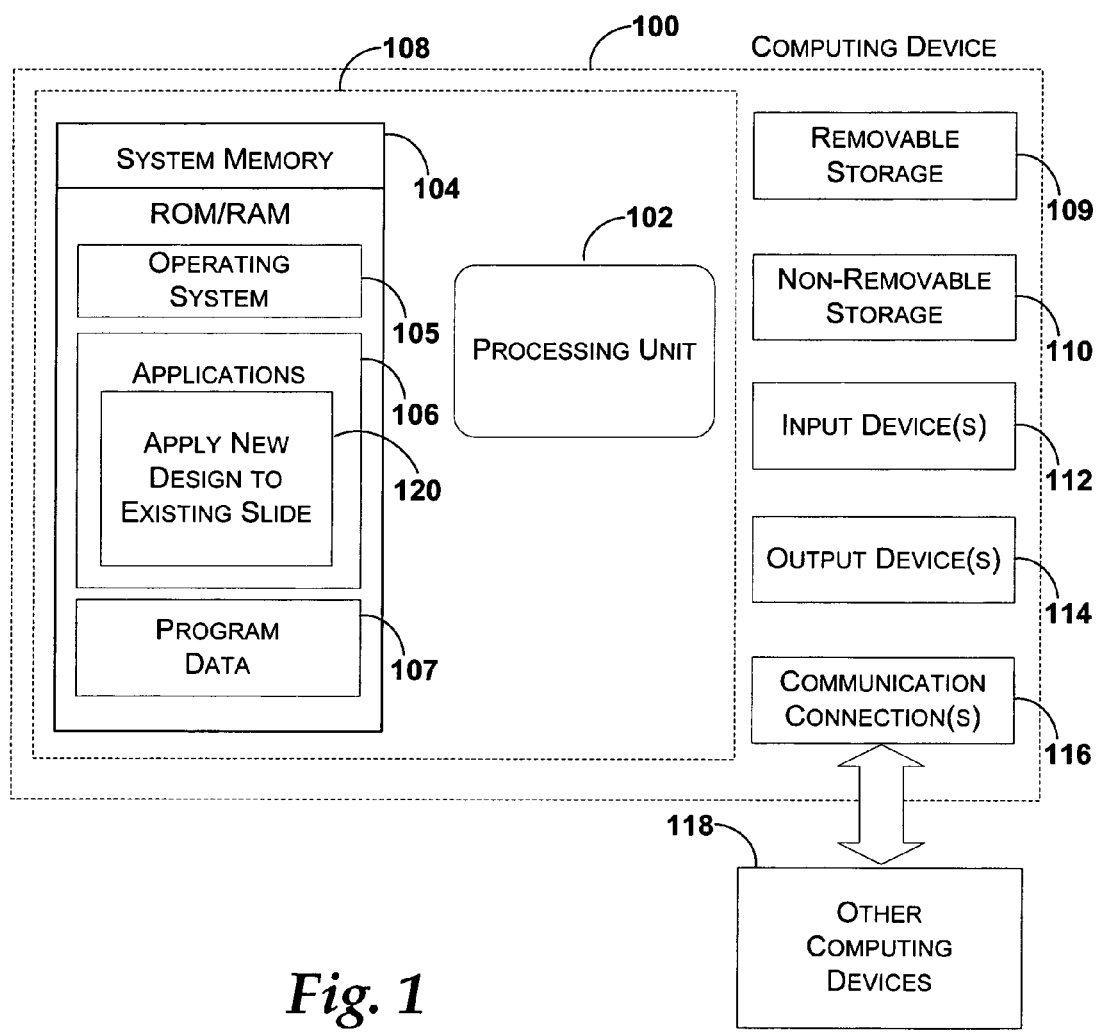
FIG. 1 illustrates an exemplary computing device that may be used in exemplary embodiments of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 may include a presentation program 120 that includes an algorithm to apply a new design to a slide. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for applying a design to a slide, comprising:
    selecting a new design to apply to a slide; wherein the slide includes a layout;
    determining an equivalent layout for the slide by comparing the slide's layout to a layout that is associated with the new design; and
    applying the equivalent layout to the slide by mapping the placeholders on the slide to the equivalent layout so that the position of the placeholders on the new slide does not overlap the background content associated with the new design.

2. The method of claim 1, further comprising maintaining any exceptions that are associated with the slide when the equivalent layout is applied to the slide.

3. The method of claim 1, wherein determining the equivalent layout, comprises comparing characteristics that are associated with the slide with characteristics associated with a layout that is associated with the new design.

4. The method of claim 3, further comprising determining at least one of: the name of the layout and the number of the placeholders.

5. The method of claim 1, wherein determining the equivalent layout comprises utilizing at least one of the following determined characteristics: a function of the placeholder and a type of the placeholder.

6. The method of claim 1, further comprising determining when a placeholder on the slide is an equivalent type to a placeholder on the layout associated with the new design.

7. The method of claim 1, further comprising determining when a placeholder on the slide is an equal type to a placeholder on the layout associated with the new design.

8. The method of claim 1, wherein applying the equivalent layout to the slide comprises moving content from placeholders within the slide to placeholders on a new slide that is based on the determined equivalent layout.

9. A computer-readable medium having computer-executable instructions for applying a new design to a slide, the instructions comprising:
matching the slide's layout with an equivalent layout that is associated with the new design; and
applying the equivalent layout to the slide by mapping the placeholders on the slide to the equivalent layout so that the position of the placeholders on the new slide does not overlap the background content associated with the new design.

10. The computer-readable medium of claim 9, wherein matching the slide's layout with the equivalent layout that is associated with the new design, comprises determining whether some characteristics associated with the slide are substantially similar to characteristics associated with the new design.

11. The computer-readable medium of claim 10, wherein determining whether some characteristics associated with the slide are substantially similar to characteristics associated with the new design, comprises determining at least one of: the name of the layout and the number of the placeholders.

12. The computer-readable medium of claim 11, wherein determining the equivalence of the placeholders comprises determining when a placeholder on the slide is an equivalent type to a placeholder on a layout associated with the new design.

13. The computer-readable medium of claim 11, wherein determining the equivalence of the placeholders comprises determining when a placeholder on the slide is an equal type to a placeholder on a layout associated with the new design.

14. The computer-readable medium of claim 11, wherein applying the equivalent layout to the slide comprises moving content from the placeholders within the slide to placeholders on a slide that is based on the equivalent layout.

15. The computer-readable medium of claim 11, wherein matching the slide's layout with the equivalent layout associated with the new design comprises comparing at least one layout associated with the new design to the slide's layout.

16. The computer-readable medium of claim 11, further comprising copying the slide's layout to the new design when it is determined that the equivalent layout does not exist.

17. The computer-readable medium of claim 11, further comprising removing any layouts from a design that do not have any dependent slides.

18. An apparatus for applying a new design to a slide, comprising:
a processor and a computer-readable storage that are configured to perform actions comprising;
means for determining an equivalent layout to a slide's layout by comparing the slide's layout to a layout that is associated with the new design; and
means for applying the equivalent layout to the slide by mapping the placeholders on the slide to the equivalent layout so that the position of the placeholders on the new slide does not overlap the background content associated with the new design.

19. The apparatus of claim 18, wherein the means for determining the equivalent layout to a slide's layout comprises means for determining when each placeholder within the slide's layout is substantially similar to each of the placeholders within a layout that is associated with the new design.

20. The apparatus of claim 18, wherein the means for determining when each placeholder within the slide's layout is substantially similar to each of the placeholders within a layout that is associated with the new design comprises, means for determining names associated with the layouts, means for determining equivalence of placeholders, and means for determining a number of placeholders.

* * * * *